J. BRESNAHAN.
FEED BAG.
APPLICATION FILED JULY 7, 1914.
1,145,744.
Patented July 6, 1915.
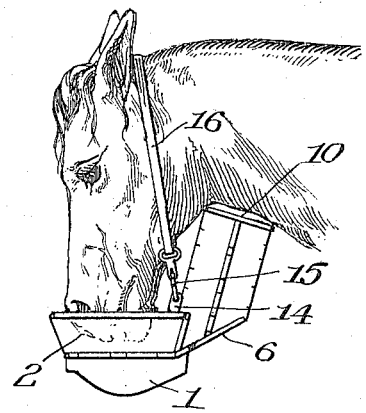
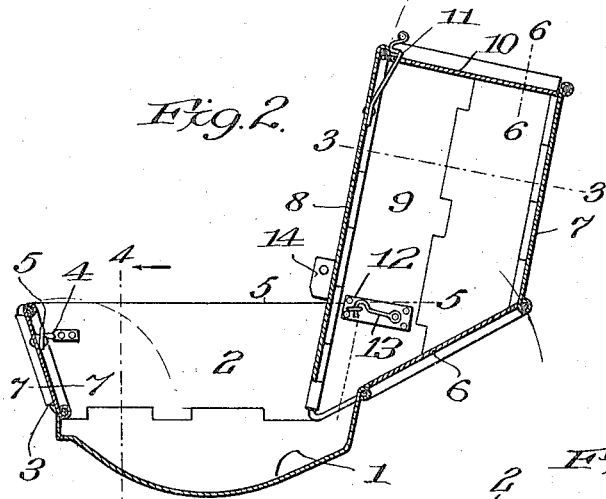
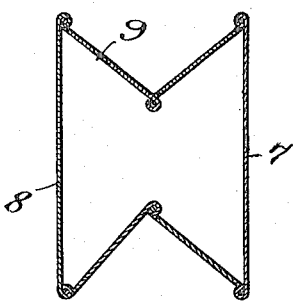
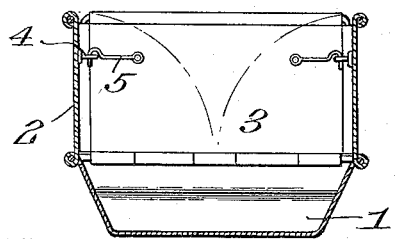
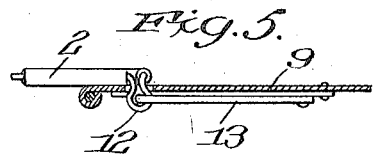
Inventor
John Bresnahan
By Victor J. Evans
Attorney
Witnesses
C. James Cronin
M. E. Laughlin

UNITED STATES PATENT OFFICE.

JOHN BRESNAHAN, OF NEWARK, NEW JERSEY.

FEED-BAG.

1,145,744.

Specification of Letters Patent.

Patented July 6, 1915.

Application filed July 7, 1914. Serial No. 849,596.

*To all whom it may concern:*

Be it known that I, JOHN BRESNAHAN, a citizen of the United States of America, residing at Newark, in the county of Essex and State of New Jersey, have invented new and useful Improvements in Feed-Bags, of which the following is a specification.

This invention relates to feed receptacles adapted to be applied to the heads of animals at feeding time and it consists in the novel features hereinafter described and claimed.

An object of the invention is to provide a collapsible receptacle of the character indicated said receptacle being formed of sheet metal. Consequently when the receptacle is not in use it may be folded up and stored away and thus it occupies but little space. When the parts of the receptacle are extended the receptacle may be applied to the head of an animal and the receptacle includes a pan having hinged upper side portions and a hopper located at the rear side of the pan the hopper being adapted to permit the feed to gravitate into the pan as the feed is consumed from the pan.

In the accompanying drawing: Figure 1 is a side elevation of the receptacle applied to the head of an animal. Fig. 2 is a sectional view of the receptacle with the parts extended. Fig. 3 is a transverse sectional view of a portion of the receptacle cut on the line 3—3 of Fig. 2. Fig. 4 is a sectional view of a portion of the receptacle cut on the line 4—4 of Fig. 2. Fig. 5 is a detailed view of parts of the receptacle cut on the line 5—5 of Fig. 2. Fig. 6 is a similar view cut on the line 6—6 of Fig. 2. Fig. 7 is a similar view cut on the line 7—7 of Fig. 2. Fig. 8 is an edge elevation of the receptacle showing the parts folded or collapsed.

As hereinbefore stated the receptacle is composed of metal and the parts thereof are hingedly connected together whereby the receptacle when not in use may be folded up into small space. The receptacle includes a pan which is hingedly connected with a hopper. In the drawing the pan is indicated at 1 and the said pan is provided with hinged sides 2 and a hinged end 3. The sides 2 are provided with eyes 4 which are adapted to receive hooks 5 pivoted upon the end 3 and thus the said sides and ends are held in extended position with relation to the pan 1. The pan 1 is hingedly connected at its inner or rear edge with the hopper bottom 6. The bottom 6 is hingedly connected with the rear side of the hopper 7 and the front side of the hopper 8 is positioned in advance of the rear side 7 thereof. Side sections 9 of the hopper are hingedly connected together at their adjacent edges and their outer edges are hingedly connected with the rear side 7 and the front side 8 respectively of the hopper. A top 10 for the hopper is hingedly connected with the rear side 7 of the said hopper and is adapted to engage a catch 11 mounted upon the front side 8 of the hopper whereby the said top is held in a closed position at the upper end of the hopper. Eyes 12 are provided at the rear ends of the sides 2 and are adapted to pass through openings in the forward sections 9 of the sides of the hopper and may be engaged by hooks 13 whereby the sides 2 will be held up against the forward portions 9 of the sides of the hopper.

When the parts are in the extended positions as shown in Figs. 1 and 2 the bottom 6 of the hopper is inclined at an angle with relation to the bottom of the pan 1 and the lower end of the front side 8 extends down between the sides 2 of the pan 1. Consequently the grain which is placed in the hopper will gravitate down along the inclined bottom 6 thereof and enter the pan 1. When the grain closes the opening at the lower end of the hopper the grain will cease to flow but as the animal consumes the grain from the pan 1 other grain will flow down from the hopper and this operation will continue until all of the grain is consumed. The side 8 of the hopper is provided at its lower portion with lugs 14 with which may be engaged snap-hooks 15 of a strap 16, and the said strap is adapted to be passed over the head of an animal whereby the receptacle is supported at the mouth of the animal while the animal is feeding from the pan 1.

After the receptacle is emptied of its contents as above indicated and it is desired to stow the device away in small space the top 10 is thrown back along the side 7 and hooks 13 are disengaged from the eyes 12. The sections 9 are then swung in an inward direction at their inner edges as indicated in Fig. 3. The hooks 5 are disengaged from the eyes 4 and the front 3 is swung toward the bottom of the pan and then the sides 2 are swung down over the front 3. The bottom 6 of the hopper is then swung back along the rear side 7 and top 10 as indicated in Fig. 8 and thus the device is collapsed. Therefore it will be seen that a feed receptacle of simple and durable structure is provided and that when the parts are set up ample room is provided for the feed to flow regularly into the pan in order that the animal may consume the feed in comfort and at leisure and without necessity of shaking its head in order to bring the feed within the range of its lips. At the same time when the device is not in use it may be easily and quickly collapsed or folded and can therefore be stowed away in a vehicle or stable and will occupy but little room.

Having described the invention what is claimed is:—

1. A feed receptacle comprising a pan having foldable sides and ends, a hopper hingedly connected with the pan said hopper having foldable sides and means for holding the parts in distended relation.

2. A feed receptacle comprising a pan having foldable sides and ends, a metallic hopper hingedly connected with the pan and having foldable sides and side sections, a top hingedly connected with the hopper, means for securing the top in a closed position and means for holding the parts of the receptacle in distended relation.

3. A feed receptacle comprising a pan having foldable sides and ends, a hopper having a bottom hingedly connected with the pan and adapted to assume an angle with relation to the bottom of the pan, means for holding the bottom at such relation to the pan, a hopper back hingedly connected with the bottom, side sections hingedly connected with the back, a hopper front hingedly connected with the side sections and a closure for the hopper.

In testimony whereof I, affix my signature in presence of two witnesses.

JOHN BRESNAHAN.

Witnesses:
JOSEPH T. BRESNAHAN,
MICHAEL BRESNAHAN.

Copies of this patent may be obtained for five cents each, by addressing the "Commissioner of Patents, Washington, D. C."